United States Patent
Brisco et al.

(10) Patent No.: US 10,116,345 B2
(45) Date of Patent: Oct. 30, 2018

(54) MULTIFUNCTIONAL PHONE CASE

(71) Applicants: Elise Brisco, Los Angeles, CA (US);
Andrew Shaifer, New York, NY (US)

(72) Inventors: Elise Brisco, Los Angeles, CA (US);
Andrew Shaifer, New York, NY (US)

(*) Notice: Subject to any disclaimer, the term of this patent is extended or adjusted under 35 U.S.C. 154(b) by 0 days.

(21) Appl. No.: 15/474,923

(22) Filed: Mar. 30, 2017

(65) Prior Publication Data
US 2017/0207811 A1 Jul. 20, 2017

Related U.S. Application Data

(63) Continuation-in-part of application No. 15/211,977, filed on Jul. 15, 2016, now abandoned.

(60) Provisional application No. 62/193,362, filed on Jul. 16, 2015.

(51) Int. Cl.
| | |
|---|---|
| *H04M 1/00* | (2006.01) |
| *H04B 1/3888* | (2015.01) |
| *G02B 27/02* | (2006.01) |
| *A45F 5/00* | (2006.01) |
| *A45C 13/00* | (2006.01) |
| *A45C 11/00* | (2006.01) |

(52) U.S. Cl.
CPC ............ *H04B 1/3888* (2013.01); *A45C 11/00* (2013.01); *A45C 13/001* (2013.01); *A45C 13/002* (2013.01); *A45C 13/005* (2013.01); *A45F 5/00* (2013.01); *G02B 27/027* (2013.01); *A45C 2011/002* (2013.01); *A45C 2011/003* (2013.01); *A45F 2200/0516* (2013.01); *A45F 2200/0525* (2013.01)

(58) Field of Classification Search
CPC .......... H04N 7/147; H04N 7/15; H04N 7/148; H04N 7/142; H04N 7/141

USPC ............................................ 455/575.1, 575.8
See application file for complete search history.

(56) References Cited

U.S. PATENT DOCUMENTS

| | | | | |
|---|---|---|---|---|
| 2005/0101348 A1* | 5/2005 | Wang | .................. | G02B 13/001 455/556.1 |
| 2007/0105603 A1* | 5/2007 | Lishan | .................... | H04M 1/21 455/575.3 |
| 2009/0126158 A1* | 5/2009 | Jian | .......................... | E05D 3/18 16/387 |
| 2010/0239242 A1* | 9/2010 | Ka | ........................ | G03B 11/043 396/448 |
| 2014/0333831 A1* | 11/2014 | Oh | ........................ | H04N 5/2254 348/376 |
| 2015/0338635 A1* | 11/2015 | Gantz | .................. | G02B 25/002 345/32 |

(Continued)

OTHER PUBLICATIONS

Shaifer, Andrew James, Multifunctional Phone Case, Office Action, U.S. Appl. No. 15/211,977, dated Dec. 30, 2016.

*Primary Examiner* — Edward Urban
*Assistant Examiner* — Max Mathew
(74) *Attorney, Agent, or Firm* — Schmeiser, Olsen & Watts LLP

(57) ABSTRACT

A multifunctional case for cell phones, tablets, and other personal electronic devices with flip, sliding, and adjustable magnifying lens for viewing a screen is disclosed. The multifunctional case includes options with a detachable lens and a handle, allowing a user carrying a smartphone or similar personal electronic device mounted in the multifunctional case an immediately available means to magnify print on objects, giving the user various ways to eliminate many occasions where reading glassed are needed.

9 Claims, 9 Drawing Sheets

(56) References Cited

U.S. PATENT DOCUMENTS

| | | | |
|---|---|---|---|
| 2016/0116348 A1* | 4/2016 | Lee | G01K 13/002 |
| | | | 374/121 |
| 2016/0213926 A1* | 7/2016 | Fukuma | A61N 1/0543 |
| 2016/0352384 A1* | 12/2016 | Ageishi | H04M 1/185 |
| 2017/0013097 A1* | 1/2017 | Edmonds | G02B 25/002 |

\* cited by examiner

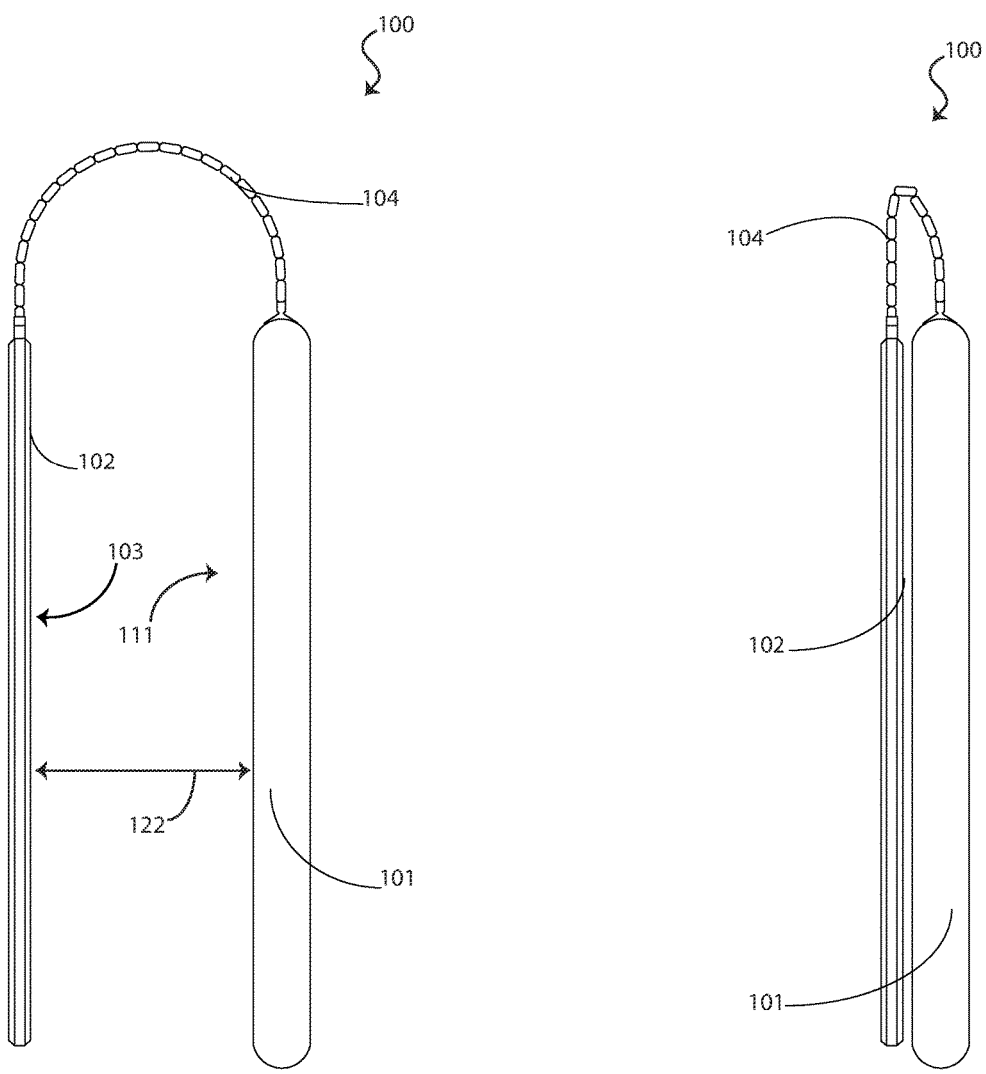

MULTIFUNCTIONAL PHONE CASE

CROSS REFERENCE TO RELATED APPLICATION

This application is a continuation-in-part of U.S. patent application Ser. No. 15/211,977, filed Jul. 15, 2016 and entitled "Multifunctional Phone Case," which claims priority to U.S. patent application Ser. No. 62/193,362 filed Jul. 16, 2015 and entitled "Multifunctional Phone Case with Flip, Sliding, Adjustable Lens for Viewing Phone Screen and Consumer Needs," each of which are incorporated entirely herein by reference.

BACKGROUND OF THE INVENTION

Technical Field

This invention relates to cases for cell phones and other personal electronic devices. In particular, the invention relates to a multifunctional smartphone, tablet, or similar personal electronic device case with a multi-position lens for viewing the display screen or other item. The adjustable, multi-position lens enables users to magnify their phone or other display screen, or items such as labels, printed materials or other unreadable of undiscernibly small subjects, without the use of glasses or other aids.

State of the Art

A large percentage of the population with normal vision at-a-distance cannot see close-up without corrective lenses, such as "reading glasses." In addition to hyperopia, commonly known as farsightedness, an inability to focus on nearby objects is often caused by the gradual loss of elasticity of the lens of the eye—presbyopia—which is a normal consequence of aging. Although necessary, many find the use of glasses for reading or close vision only to be inconvenient and unfashionable. Because presbyopia is associated with aging, some persons believe the use of reading glasses makes them appear "old." Clearly visualizing a display screen on smartphones, cellular telephones, smart watches and other personal electronic devices is often difficult for persons with visual impairment, including presbyopia, and can be very difficult or impossible without reading glasses. Alternatively the viewer may need to move the subject very close to their eyes which is inconvenient and can be embarrassing.

There are problems with the use of reading glasses and other available devices attempting to address this issue. Reading glasses are frequently lost or damaged, thus often require replacement. Moreover, available devices to enhance viewing of smartphone screens and existing software applications to magnify the display are difficult to use, do not have a multifunctional purpose, and do not store well, among other shortcomings.

What is needed, therefore, is an adjustable, multi-function visual aid for reading smartphone and personal electronic device screens, with additional functionality to aid the viewing of print and other objects.

SUMMARY OF EMBODIMENTS

Disclosed is a multifunctional cell phone case with an adjustable and removable lens for enhanced viewing of a screen such as found on a personal electronic device, or other items without the need for reading glasses or similar aids. Embodiments of the case have a lens mounted to a cover which is adjustably positioned with respect a screen of a cell phone or other personal electronic device.

Disclosed is a multifunctional electronic device case having a body, wherein the body is configured to receive an electronic device; a cover hingedly coupled to the body; and a lens coupled to the cover, wherein rotating the cover with respect to the body positions the lens with respect to an electronic device screen.

In some embodiments, the multifunctional electronic device case further comprises a poly-articulated hinge member coupled between the cover and the body, wherein the poly-articulating hinge member hingedly couples the cover to the body. In some embodiments, the body comprises a short side and a long side, wherein the poly-articulated hinge member is coupled to the short side. In some embodiments, the body is coupled to the long side. In some embodiments, the poly-articulated hinge member is detachably coupled to the body.

In some embodiments, the multifunctional electronic device case has a stand coupled to the body. In some embodiments, a plurality of stands are coupled to the body.

In some embodiments, the lens magnifies an image displayed on the personal electronic device screen. In some embodiments, a change in magnification of the image is continuous and proportional to a changing distance from the lens to the personal electronic device screen.

In some embodiments, the poly-articulated hinge member is detachably coupled to the cover.

Disclosed in an alternate embodiment is a multifunctional electronic device case having a body having a long side and a short side; a sliding member coupled to the body; a cover coupled to the sliding member; and a lens coupled to the cover; wherein the lens is adjustably positioned with respect to the body.

In some embodiments, the body comprises a short side, wherein sliding member is coupled to the short side. In some embodiments, the body comprises a long side, wherein sliding member is coupled to the long side.

In some embodiments, the electronic device case has a poly-articulated hinge member coupled between the cover and the sliding member, wherein the poly-articulating hinge member hingedly couples the cover to the sliding member. In some embodiments, the sliding member moves with respect to the body in a direction parallel to the long side. In some embodiments, the sliding member moves with respect to the body in a direction parallel to the short side.

Disclosed is a method of forming a multifunctional personal electronic device case to create a magnified image of a device screen having steps forming a case body to receive a personal electronic device; fitting the case body with a slidable member; and coupling a cover mounted to a magnifying lens to the slidable member.

In some embodiments, the multifunctional electronic device case further comprises a stand coupled to the body. In some embodiments, the device case comprises a plurality of stands coupled to the body.

In some embodiments, the coupling step comprises coupling a poly-articular hinged coupling between the slidable member and the cover.

The foregoing and other features and advantages of the present invention will be apparent to those of ordinary skill in the art from the following more particular description of the invention and its embodiments, and as illustrated in the accompanying drawing figures.

BRIEF DESCRIPTION OF THE DRAWINGS

FIG. 4 is a right side view of a multifunctional electronic device case with an electronic device and a partially deployed cover;

FIG. 5 is a right side view of a multifunctional electronic device case holding an electronic device and a stored cover;

DETAILED DESCRIPTION OF EMBODIMENTS OF THE INVENTION

Embodiments of the disclosed invention enable users to see their phone or other personal electronic device screen without the use of an alternative magnification means, such as reading glasses. Additionally, embodiments provide a magnifying lens as an extension of the user's cell phone—a device carried by nearly everyone. The device includes a magnifying lens which may be pivoted away or detached from the device screen for use in other commonly necessary applications, such as reading the small print on labels, and the like. The disclosed device and methods of use provide a means for reading fine print that is always available to anyone carrying a smartphone.

Throughout this disclosure, the terms "phone case, "electronic device case," "personal electronic device case" are used interchangeable. Accordingly, "cell phone," "smartphone," "electronic device," and "personal electronic device" are also used interchangeably and, in the context of this disclosure and the claims that follow, mean any of a number of devices bearing a screen, such as a touchscreen, on which a user of the device views an image. In some, but not all, embodiments, the screen may additional provide a means wherein the user inputs instructions to the device, such as touching the screen by touching, tapping, swiping and the like.

Figure 1:
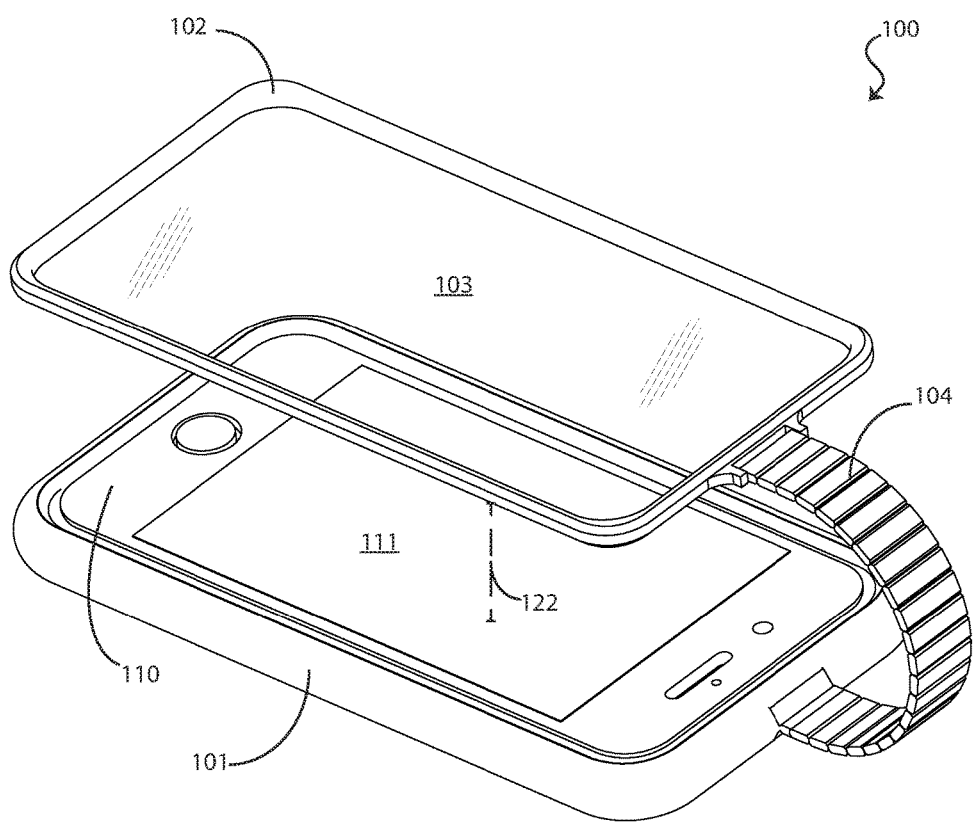
FIG. 1 is a front right perspective view a multifunctional electronic device case holding an electronic device.

FIG. 1 is a front right perspective view of a multifunctional phone case holding an electronic device. FIG. 1 shows a multifunctional phone case 100 holding an electronic device 110 having a device screen 111. Case 100 comprises a body 101. Body 101 has a shape substantially closed on four sides and a back/bottom, while open at the front/top to receive an electronic device 110, such as a smartphone. Similar to a conventional cover for a smartphone or other personal electronic device, the general shape of electronic device 110 may reversibly interlock with an internal feature of body 101, wherein electronic device 110 is freely removable from body 101. In this example, and in some other embodiments, electronic device 110 is a smartphone. This is not meant to be limiting. Electronic device 110 can be a tablet device, a conventional cell phone, a smart watch, a wearable electronic device, and the like, as shown in some embodiments. Consequently, body 101, is formed in different dimensions and shapes according to the particular electronic device 110 intended to be used with case 100.

Cover 102 is hingedly coupled to body 101 and has a lens 103. Cover 102, as shown in FIG. 1, encircles lens 103, acting as a mount for lens 103 and a structure wherein lens 103 is coupled to body 101 through an interposed adjustable means, such as an adjustably hinged coupling means, for example. Cover 102 may take many forms according to alternative embodiments. For example, in some embodiments, cover 102 is coupled to a segment of a perimeter of lens 103 without completely encircling the perimeter of lens 103, as in the embodiment shown in FIG. 1.

Also shown is a hinge member 104 coupled to body 101 and cover 102. In some embodiments, including the embodiment shown by FIG. 1, hinge member 104 comprises greater than three hinges linked together as a multiple hinge. In some alternative embodiments, hinge member comprises two hinges, or greater than three hinges linked together as a multiple hinge. In some embodiments, hinge member 104 comprises a single hinge. In some embodiments, hinge member 104 is a "living hinge," wherein hinge 104 is a thin flexible hinge made from the same material as the two rigid pieces it connects; namely cover 102 and body 101. In embodiments wherein hinge 104 comprises a plurality of hinges linked together, cover 102 bearing lens 103 is adjusted across a continuous range of positions, wherein lens 103 is positioned an adjustable distance 122 from device screen 111. Friction between hinge elements of each of the plurality of hinges comprising hinge 104 acts to stabilize a conformation of hinge 104, tending to hold cover 102 in a position set by the user of case 100. In some embodiments wherein lens 103 is a magnifying lens, adjustability of distance 122 allows a user of case 100 to select a desired magnification for an image viewed on device screen 111. Moving lens 103 closer to device screen 111 may decrease magnification of the image, while moving lens 103 further away from device screen 111 may increase magnification of an image, at least within a limited range of distances 122 for some embodiments wherein lens 103 has a fixed focal length.

Figure 2:
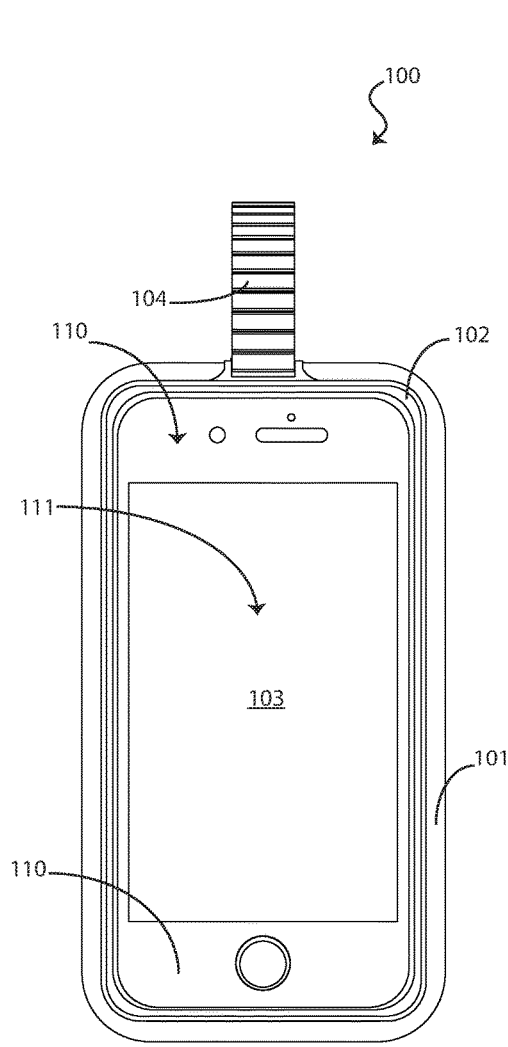
FIG. 2 is a front view of a multifunctional electronic device case holding an electronic device.

FIG. 2 is a front view of a multifunctional phone case holding an electronic device. FIG. 2 shows the front of electronic device 110 held by body 101. Device screen 111 can be seen beneath lens 103. Lens 103 is formed of a substantially transparent material, such as polycarbonate plastic, glass, and the like. Polycarbonate, other transparent plastic polymers, and "gorilla glass®"-like substances are preferred over glass for forming lens 103 due to the lighter weight and relative resistance to breakage of many synthetic plastics. This is not meant to be limiting, however; lens 103 may be formed from any suitably transparent material. Lens 102 is mounted onto cover 102, which is coupled to body 101 by hinge member 104. Accordingly, a user of case 100 may manipulate cover 102 to position lens 103 relative to device screen 111 to obtain a desired level of magnification of objects on screen 111. When electronic device 110 is not in use, the user may position cover 102 directly against the front surface of electronic device 110 for storage (see FIG. 5).

Figure 3:
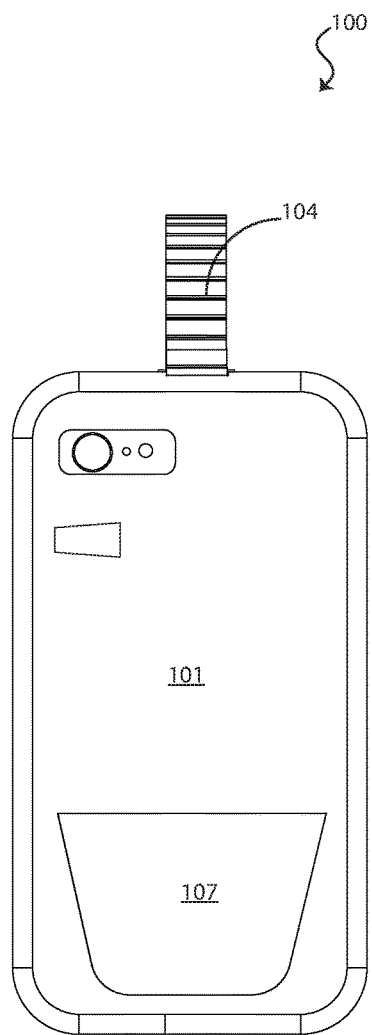
FIG. 3 is a back view of a multifunctional electronic device case holding an electronic device.
Figures 7, 8:
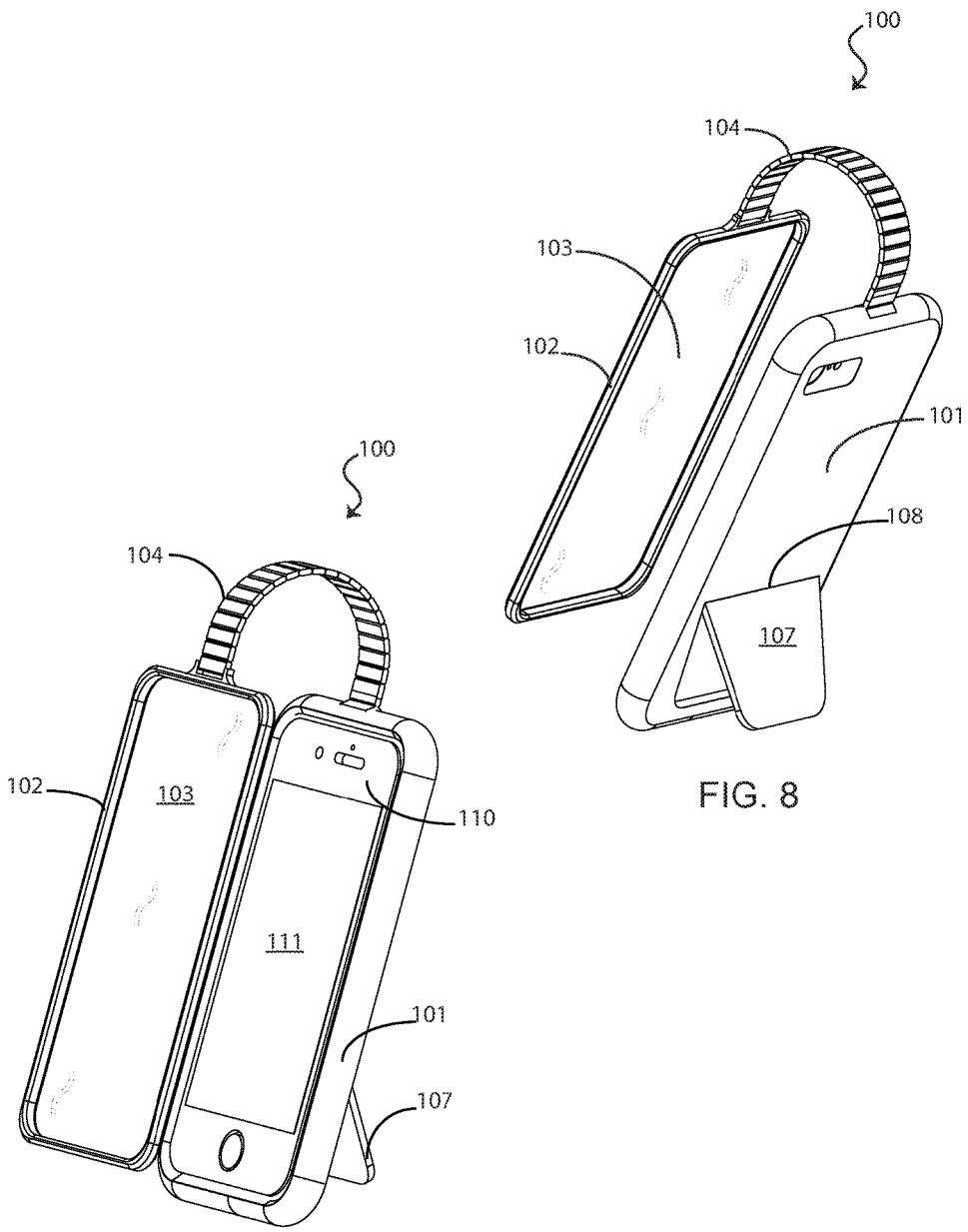
FIG. 7 is a front perspective view of a multifunctional phone case holding an electronic device and supported vertically by a deployed stand.
FIG. 8 is a rear perspective view of a multifunctional electronic device case holding an electronic device and supported vertically by a deployed stand.
Figure 9:
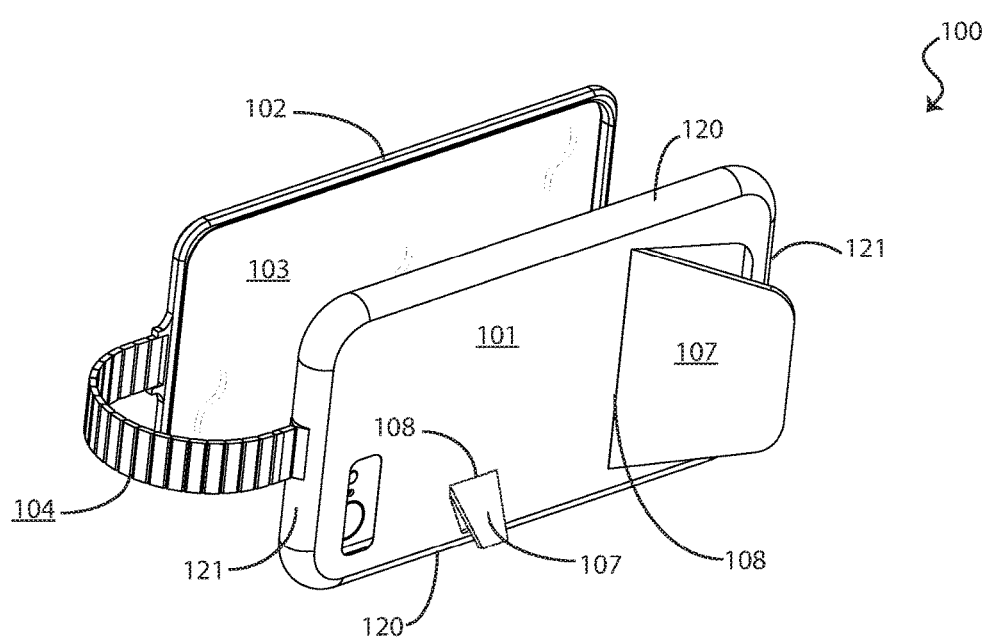
FIG. 9 is a rear perspective view of a multifunctional electronic device case holding an electronic device and supported horizontally by a deployed stand

FIG. 3 is a back view of a multifunctional phone case holding an electronic device. In addition to body 101 and hinge member 104, FIG. 3 shows a stand 107. In some embodiments, electronic device case 100 comprises stand 107 coupled to body 101. Stand 107 is any structure wherein case 100 is retained in a semi-upright position to facilitate viewing of device screen 111. A wide variety of shapes and designs of stand 107 are possible, beyond the general polygonal shape and location of stand 107 shown in the several drawing figures. Stand 107 is coupled at any location of an outer surface of body 101, without limitation. Stand 107 may be hingedly coupled, detachably coupled, or formed as a unitary body with body 101 of case 100. In some embodiments, stand 107 is moved by a user between a retracted first position and a deployed second position. For example, FIGS. 7-9 show stand 107 in a deployed second position, whereas FIG. 3 shows stand 107 in a retracted first position. In some embodiments wherein stand 107 is formed as a unitary body with body 101, stand 107 is fixed in the retracted first position. Some embodiments of device case 100 to not comprise stand 107.

FIG. 4 is a right side view of a multifunctional phone case with an electronic device and a partially deployed cover 102. FIG. 4 shows a profile of cover 102 positioned a distance 122 from device screen 111. Conversely, FIG. 5 is a right side view of a multifunctional phone case holding an electronic device and a stored cover showing cover 102 directly proximate to body 101. The multi-hinge design of hinge member 104 allows positioning of cover 102, and consequently lens 103, at a distance 122 having any value along a continuum within a range of distances 122 determined by the size and number of individual hinges forming hinge member 104.

Figure 6:
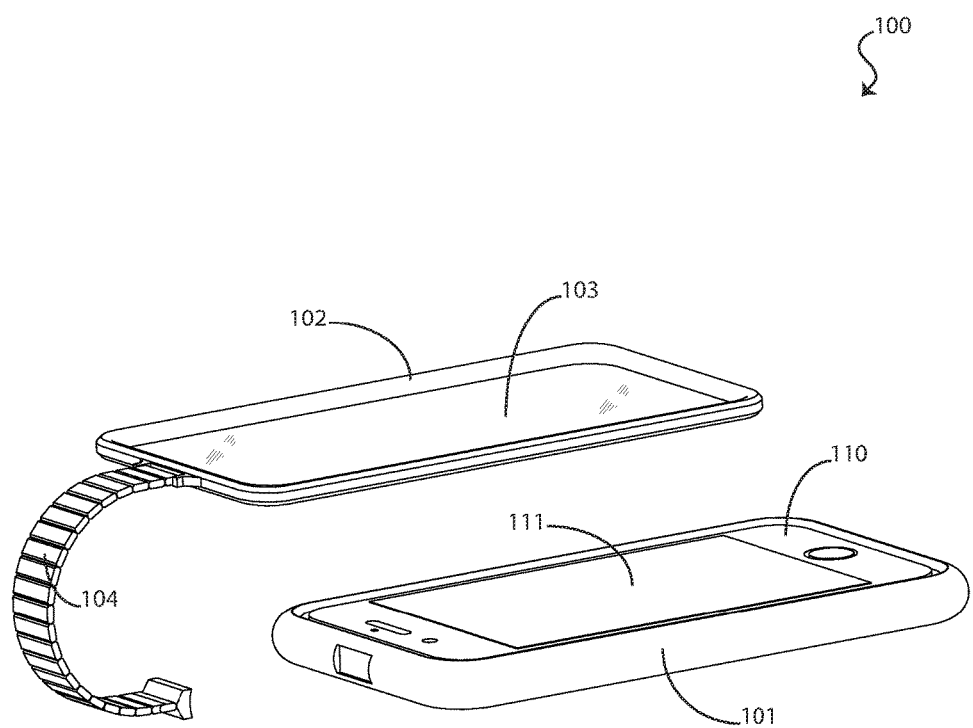
FIG. 6 is a perspective view of a multifunctional electronic device case holding an electronic device and a detached cover.

FIG. 6 is a perspective view of a multifunctional phone case holding an electronic device and a detached cover. FIG. 6 shows a representative embodiment wherein a user of case 100 may detach cover 102 with hinge member 104 completely from body 101. For example, in some embodiment, body 101 comprises a receive for detachably receiving hinge member 104, wherein hinge member 104 is a poly-articulated multiple hinge capable of positioning cover 102 bearing lens 103 flush against either device screen 111 or a rear-aspect of electronic device 110, or in any position on a continuum between flush with device screen 111 and the rear-aspect of electronic device 110. In this way, the user may employ magnifying lens 103 in a variety of uses unrelated to viewing device screen 111, or other functions related to electronic device 110. For example, a detached lens 103 mounted on cover 102 can be used to assist a user in reading fine-print on product labels or other printed material, viewing details on a map, and the like. Because owners of electronic devices, such as smartphone devices, generally keep the device on their person at most times, a user of case 100 can expect to always have a magnifying lens readily available. This obviates the need for the user to carry a conventional text magnifying means, such as reading glasses, in many situations. A point of reversible attachment for hinge member 104 from body 101 is shown in FIG. 6 by way of example only. In some embodiments, hinge member 104 reversibly attaches to cover 102. Wherein hinge member 104 reversibly attaches to body 101 and remains attached to cover 102, however, hinge member 104 may be used as a handle for a user of case 100 to hold lens 103 in a desired position relative to text, other printed material, or object surface the user seeks to view in proper focus or with magnification.

In some embodiments, case 100 is supplied with a plurality of covers 102 bearing a lenses 103 with different focal lengths, different magnification factors, or different focal lengths and magnification factors, wherein the user of case 100 may interchange different covers 102, each bearing a different lens 103, to utilize lens 103 of the desired magnification or focal length. Exchanging cover 102 comprises detaching hinge 104 from body 101, in some embodiments. In some embodiments, exchanging cover 102 comprises detaching hinge 104 from cover 102.

In some embodiments, lens 103 is detachably coupled to cover 102. For example, a user can remove lens 103 from cover 102 by disengaging the edge or some like surface feature of lens 103 from a complementary receiving groove or other surface feature of cover 102. In these and similar embodiments, the user of case 100 may remove lens 103 comprising one magnification factor and focal length with lens 103 having a different magnification factor, a different focal length, or a different magnification factor and a different focal length.

FIG. 7 is a front perspective view of a multifunctional phone case holding an electronic device and supported vertically by a deployed stand and FIG. 8 is a rear perspective view of a multifunctional phone case holding an electronic device and supported vertically by a deployed stand. FIG. 7 and FIG. 8 show stand 107 supporting electronic device 110 in a substantially vertical position. This is useful to a user of case 100, wherein the user can support device 110 on a surface, such as a desk or countertop, for immediate viewing of screen 111 without needing to pick-up or otherwise reposition device 110.

FIG. 9 is a rear perspective view of a multifunctional phone case holding an electronic device and supported horizontally by a deployed stand. As shown in drawing figures, stand 107 is coupled to base 101 by stand coupling 108, in some embodiments. In some embodiments of case 100, body 101 has a long side 120 and a short side 121, as shown by FIG. 9. Stand coupling 108 is located at a position on base 101 wherein device screen 111 is presented for viewing by the user of case 100. This position may be oriented generally parallel to long side 120, or generally parallel to short side 121 of body 101. In some embodiments, including the example embodiment shown by FIG. 9, a plurality of stands 107 are coupled to base 101, wherein a user of case 100 may view device screen 111 oriented in a "portrait" screen position (as shown by FIG. 8 and FIG. 9) or a "landscape" screen position as shown by FIG. 9. In some embodiments, stand coupling 108 is coupled to body 101 in any number alternative orientations not shown in the drawing figures to facilitate viewing of an image displayed on device screen 111 for the user.

In some embodiments, including those shown in FIGS. 10-13, case 100 comprises a sliding member 105 coupled to body 101 and cover 102. In some additional embodiments, sliding member 105 is coupled to hinge member 104, which is, in turn, coupled to cover 102. This mechanism employing a sliding member increases the versatility, as described in detail below, wherein lens 103 mounted on cover 102 can be positioned by a user of case 100 to optimally view images displayed on device screen 111, particularly with some electronic devices 110, such as a larger tablet device.

Figure 10:
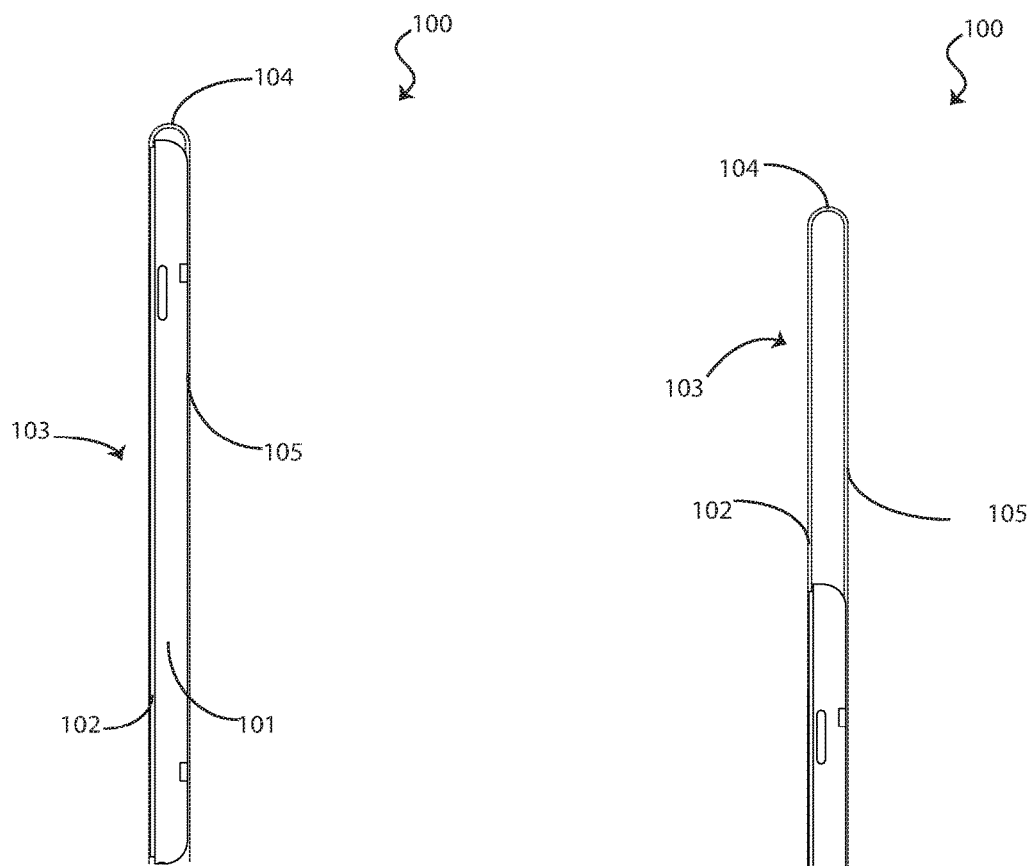
FIG. 10 is a right side view of a multifunctional electronic device case holding an electronic device with a closed sliding member.
Figure 11:
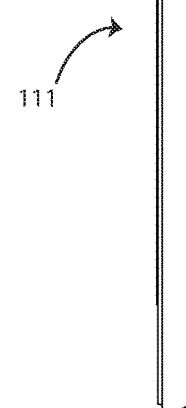
FIG. 11 is a right side view of a multifunctional electronic device case holding an electronic device with a partially open sliding member.

FIG. 10 is a left side view of a multifunctional phone case holding an electronic device with a closed sliding member and FIG. 11 is a left side view of a multifunctional phone case holding an electronic device with a partially open sliding member. In some embodiments, sliding member 105 is coupled to body 101 and is a means for cover 102 to move in a plane generally parallel with body 101 and device screen 111, as shown in FIG. 10 and FIG. 11. Most conventional device screens today are touch-activated screen, wherein a user contacts the screen with a fingertip to touch, tap, or swipe the device screen to input an instruction to the electronic device. In some embodiments of case 100 wherein lens 103 partially or completely blocks a user from touching device screen 111, such as the example embodiments shown in FIG. 1, FIG. 4, FIG. 7, and FIG. 8, the user may not be able to easily input touch-activated commands to electronic device 110. In some embodiments of case 100 comprising sliding member 105, therefore, cover 102 and lens 103 can be moved away from device screen 111 by causing sliding member 105 to move from a position relative to body 101 shown in FIG. 10 to the position shown by FIG. 11. The user, therefore, can activate sliding member 105 to move lens 103 from a position proximate to device screen 111 wherein observation of an image displayed on screen 111 may be comfortably viewed under magnification, such as the position shown in FIG. 10, to a position away from device screen 111 wherein screen 111 is unobstructed by lens 103 or cover 102 allowing the user to input touch commands via screen 111, such as the position shown in FIG. 11.

In some embodiments, including the embodiments shown in FIG. 10 and FIG. 11, movement of sliding member 105 is generally linear. In some embodiments (not shown by the drawing figures), movement of sliding member 105 is generally curvilinear, such as in an arc-shape, for example. In some embodiments, sliding member 105 is coupled to body 101 such that cover 102 and lens 103 move in a generally linear direction parallel to long side 120, such as in the example embodiments shown in FIG. 10 and FIG. 11. In some embodiments, sliding member 105 is coupled to body 101 such that cover 1021 and lens 103 move in a generally linear direction parallel to short side 121 of body 10 (not shown in the drawing figures).

Figure 12:
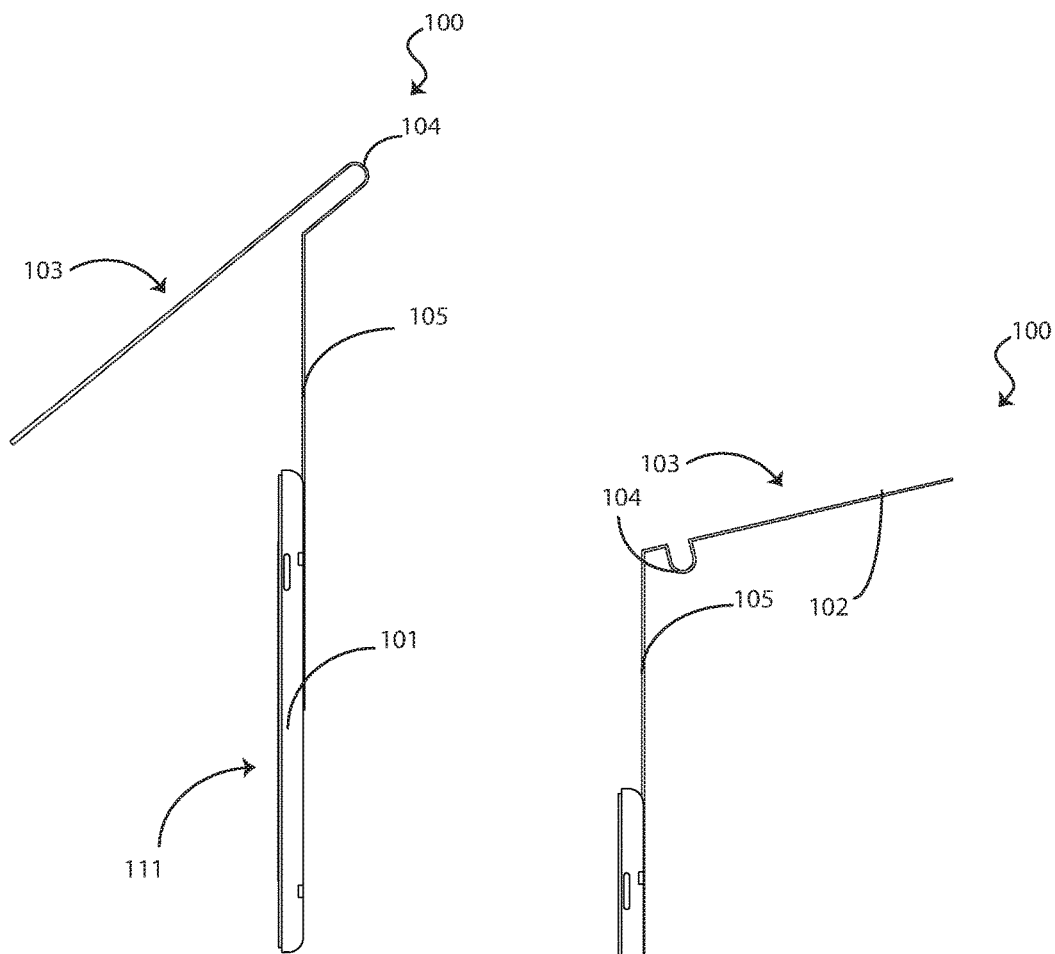
FIG. 12 is a left side view of a multifunctional electronic device case holding an electronic device with an open sliding member and a partially deployed cover.
Figure 13:
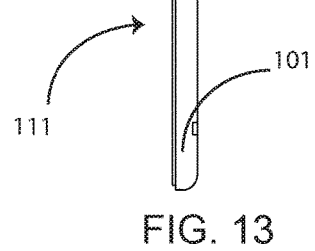
FIG. 13 is a left side view of a multifunctional electronic device case holding an electronic device with an open sliding member and a reverse-deployed cover.

Additionally, some embodiments of case 100 enable a user to slide cover 102 and lens 103 away from a position proximate to device screen 111, and to also rotate cover 102 and lens 103 further away from screen 111. FIG. 12 is a left side view of a multifunctional phone case holding an electronic device with an open sliding member and a partially deployed cover and FIG. 13 is a left side view of a multifunctional phone case holding an electronic device with an open sliding member and a reverse-deployed cover. In some embodiments comprising both sliding member 105 and hinge member 104, cover 102 and lens 103 may be slid and rotated completely away from the front aspect of electronic device 110, wherein cover 102 and lens 103 are positioned proximate to a rear aspect of body 100 and electronic device 110. For example, a user may move sliding member 105 causing lens 103 to uncover device screen 111, such as shown by FIG. 11 and. FIG. 12, and additionally rotate cover 102 on hinge member 104 wherein cover 102 and lens 103 are positioned proximate to body 101, such as the position shown by FIG. 13.

A multifunctional case for a phone or other personal electronic device has been disclosed. The different embodiments of the multifunctional phone case allow a user many options for positioning a magnifying lens relative to the screen of a personal electronic device held within the case. Embodiments wherein a magnifying lens is detachable from the case additionally provide the user with a more convenient and readily available alternative to reading glasses, or other magnifying means completely separate from a smartphone or other device case, to assist the user in reading small print.

The components defining any multifunctional phone case may be formed of any of many different types of materials or combinations thereof that can readily be formed into shaped objects provided that the components selected are consistent with the intended opefactorn of a multifunctional phone case. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any multifunctional phone case may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

Figure 14:
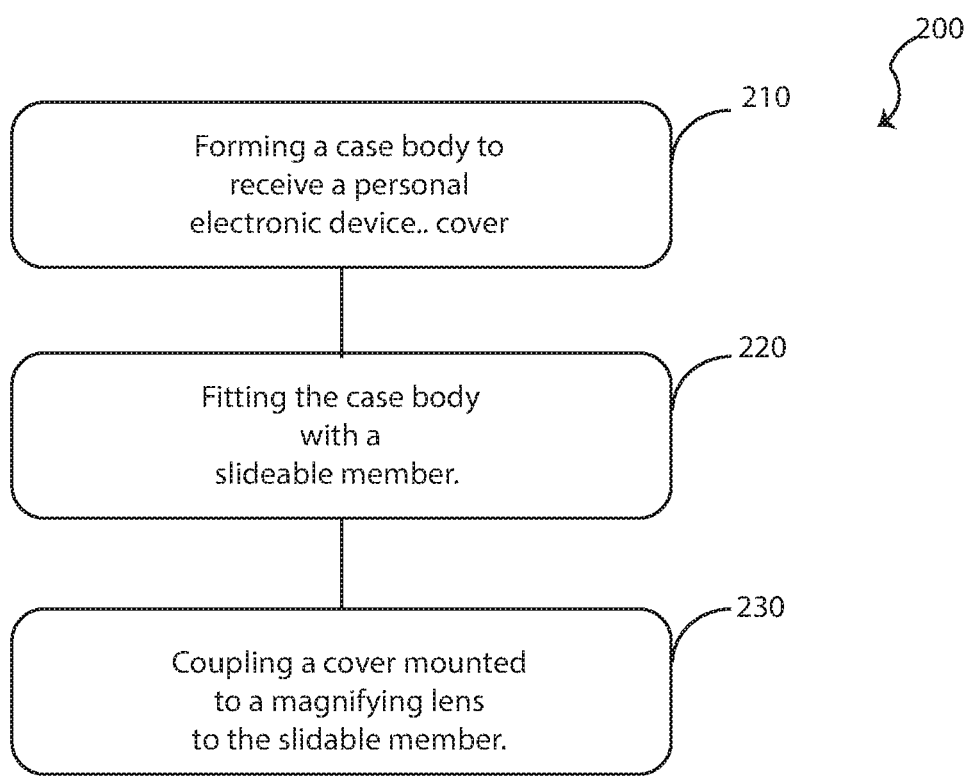
FIG. 14 is a block diagram of a method of forming a multifunctional electronic device case.

FIG. 14 is a block diagram of a method of forming a multifunctional personal electronic device case. FIG. 14 shows a method 200 comprising a forming step 210, a fitting step 220, and a coupling step 230.

Forming step 210 comprises foaming a case body to receive a personal electronic device. Methods for forming a body to receive a personal electronic device comprise those methods currently know in the art and those methods as yet unknown but to be developed. Various materials which may be used and manufacturing techniques for formation of such materials into an electronic device case body are discussed in detail herein above.

Fitting step 220 comprising fitting the case body with a slidable member. The slidable member is any means wherein a lens, such as a magnifying lens coupled to the case body by a slidable member, so that a user of the multifunctional electronic device case may move the lens relative to the case body by activating the slidable member. In some embodiments, movement of the slidable member is linear. In some embodiments, movement of the slidable member is curvilinear, such as in an arc.

Coupling step 230 comprises coupling a magnifying lens to the slidable member. In some embodiments, coupling step 130 comprises fitting the lens into a cover, wherein the cover is coupled to the slidable member. Many possible configurations of the cover relative to the lens are possible. For example, the cover may be a rim of material completely encircling the perimeter of the lens. Alternatively, the cover may comprise a tab of material coupled to a limited segment of length along the perimeter of the lens, coupled to the slidable member. Other variations wherein the lens is coupled to the slideable member by the cover are possible and within the scope of the disclosed method.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustfactorn and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A multifunctional electronic device case comprising:
a poly-articulated hinge having opposed first and second ends, the poly-articulated hinge comprising a plurality of articulated hinge segments sequentially coupled together;
a body coupled to the first end of the poly-articulated hinge, wherein the body receives an electronic device;
a cover coupled to the second end of the poly-articulated hinge; and
a lens coupled to the cover, wherein rotating the cover with respect to the body positions the lens with respect to an electronic device screen, wherein the position of the lens with respect to the electronic device screen is self-maintaining in response to friction between the articulated hinge segments.

2. The multifunctional electronic device case of claim 1, wherein the body comprises a short side, wherein the first end of the poly-articulated hinge is coupled to the short side.

3. The multifunctional electronic device case of claim 1, wherein the body comprises a long side, wherein the first end of the poly-articulated hinge is coupled to the long side.

4. The multifunctional electronic device case of claim 1, wherein the poly-articulated hinge is detachably coupled to the body.

5. The multifunctional electronic device case of claim 1, further comprising a stand coupled to the body.

6. The multifunctional electronic device case of claim 1, further comprising a plurality of stands coupled to the body.

7. The multifunctional electronic device case of claim 1, wherein the lens magnifies an image displayed on a screen of the electronic device.

8. The multifunctional electronic device case of claim 7, wherein a change in magnification of the image is continuous and proportional to a changing distance from the lens to the screen.

9. The multifunctional electronic device case of claim 1, wherein the poly-articulated hinge is detachably coupled to the cover.

\* \* \* \* \*